United States Patent [19]

Schindler

[11] 4,074,916
[45] Feb. 21, 1978

[54] FLAG SEAL INCLUDING FLATTENED SIDE-WALL AND OVAL CABLE

[75] Inventor: Robert Schindler, Angola, Ind.
[73] Assignee: Brammall, Inc., Angola, Ind.
[21] Appl. No.: 658,905
[22] Filed: Feb. 18, 1976
[51] Int. Cl.² .......................... G09F 3/00; F16G 11/04
[52] U.S. Cl. ............................. 292/307 R; 24/115 H; 24/136 A
[58] Field of Search ........... 292/307 R, 307 A, 307 B, 292/315, 323, 325, 326, 321; 24/136 A, 135 N, 115 H, 136 R; 339/247; 403/368; 70/49; 57/144

[56] References Cited

U.S. PATENT DOCUMENTS

| 235,668 | 12/1880 | Brooks | 292/307 A |
| 1,139,595 | 5/1915 | Starr | 24/136 A |
| 2,412,097 | 12/1946 | Russell | 24/136 A |
| 3,372,952 | 3/1968 | Newton | 292/307 |
| 3,770,307 | 11/1973 | Van Gompel | 292/307 R |
| 3,937,507 | 2/1976 | McCoag | 292/307 R |

Primary Examiner—Paul R. Gilliam
Assistant Examiner—Kenneth J. Dorner
Attorney, Agent, or Firm—Hill, Gross, Simpson, Van Santen, Steadman, Chiara & Simpson

[57] ABSTRACT

A locking mechanism utilizing a cable in which the cable has been flattened so as to give it an oval or flattened shape and wherein an orifice into which the cable is inserted for one way motion is flattened so as to prevent the cable from being twisted or turned thus preventing the cable from being removed from the locking device. In certain embodiments the locking device may, when in the locked position, have a loop of cable extending from it and in another embodiment a cable with a flag attached thereon may be used with the locking device.

1 Claim, 4 Drawing Figures

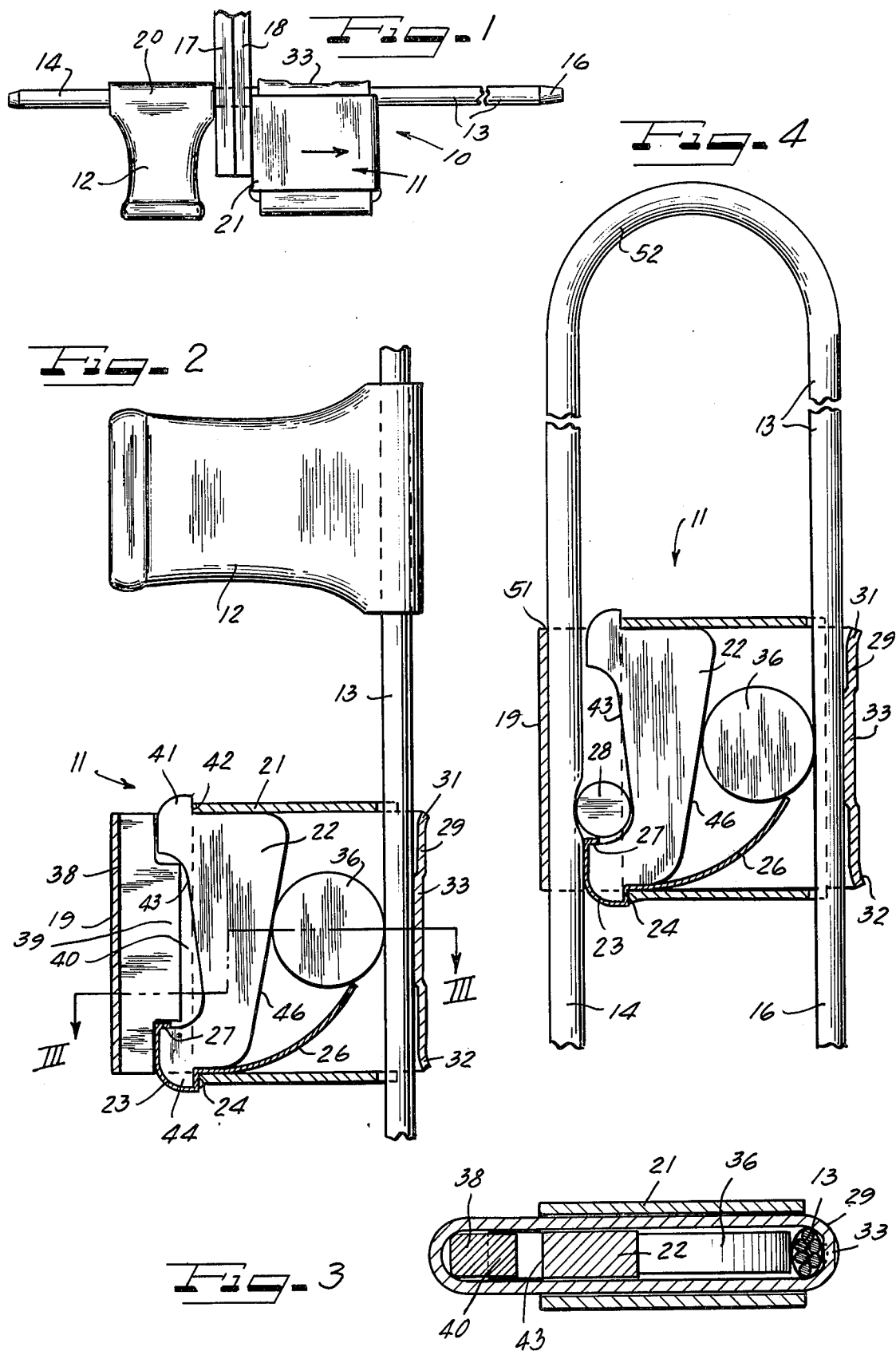

FLAG SEAL INCLUDING FLATTENED SIDE-WALL AND OVAL CABLE

BACKGROUND OF THE INVENTION

1. Field of the Invention

This invention relates in general to security devices and in particular to a novel locking assembly.

2. Description of the Prior Art

Locking devices in which a cable is inserted into an orifice and is gripped for one way motion have been known but such prior art devices have utilized the cable in its round condition and due to the twisting of the strands of the cable it has been in certain instances possible to turn the cable thus unthreading it from the locking device.

SUMMARY OF THE INVENTION

The present invention comprises a novel cable locking device in which the cable to be inserted into the locking device is flattened into an oval shape and the orifice into which the cable is to be inserted is formed with a flat portion such that the cable cannot be rotated or threaded relative to such opening thus preventing a cable to be unthreaded from the locking device.

Other objects, features, and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a side plan view of the invention used with a flag attached to the seal and the cable extending through the locking device;

FIG. 2 is a sectional view of the locking device illustrated in FIG. 1;

FIG. 3 is a sectional view taken on line III—III from FIG. 2; and

FIG. 4 illustrates a modification of the invention in sectional view wherein the cable is formed into a loop.

DESCRIPTION OF THE PREFERRED EMBODIMENTS

FIG. 1 illustrates the cable locking means of the invention 10 which was passed through openings formed through a pair of hasps 17 and 18 and wherein a cable 13 has a flag 12 attached to one end 14 by crimping a portion 20 of a flag 12 to the end 14 of the cable. The cable is then passed through the openings in the hasps 17 and 18 and a locking device 11 is passed over the end 16 of the cable. The locking device 11 can be freely moved onto the cable in a first direction but cannot be moved in the opposite direction. For example, in the apparatus of FIG. 1 the locking device 11 can be moved to the left relative to the Figure but it cannot be moved to the right of the cable once it has been inserted thereon since it locks and prevents movement of the cable to the left relative to FIG. 1.

FIG. 2 is a sectional view through the locking device 11 and shows a first generally rectangular member 19 which is formed with open ends about which a second generally rectangular hollow member 21 fits so as to hold a cam member 22 thereon. The cam member 22 has a projection 41 which engages an end 42 of the member 21 and a block 38 fits in a first end of the member 19 and has a projection 39 which fits into a notch 40 formed in cam member 22. The cam 22 has an inclined surface 43 and a spring 23 has an end 27 that engages the block 38 and passes about a notch 44 that engages a portion 24 of the member 21. The spring 26 extends into the confines of the member 21 and spring biases a disc 36 up a second inclined surface 46 of the cam member 22. The disc 36 locks the cable to the device to prevent motion in one direction but allows motion in the other direction. A portion 29 of the member 19 is adapted to receive the cable 13 therein and the opposite ends 31 and 32 are flared to facilitate the cable passing therethrough. The middle portion 33 adjacent the disc 36 of the portion 29 is flattened as shown in FIG. 3 so as to engage and prevent the oval shaped cable 13 from being twisted or rotating thereto. It is to be noted that the cable 13 is flattened into an oval shape and this in combination with the flattened portion 33 of the member 29 prevents the cable from being twisted or turned within the confines of the locking device 11 since the disc 36 firmly presses the oval cable 13 against the flattened portion 33 thus preventing the cable from being turned or twisted.

A modification of the invention is illustrated in sectional view in FIG. 4 wherein rather than the flag 12 and the bar 38 being used, the cable 13 has its first end 14 inserted into an opening 51 in the locking member 11 and a disc 28 rides on inclined surface 43 and engages cable 19. A loop portion of the cable 52 is passed through a hasp or other device to be locked and the end 16 is then passed through the portion 29 so as to lock with the disc 36 and the flattened portion 33 as shown. The cable 13 is formed into an oval shape so as to prevent the cable from being twisted or turning relative to the portion 29.

The inclined surfaces 43 and 46 are selected so that they cam the discs 28 and 36 to lock the cable relative to the locking device 11 so for example, the cable 13 cannot be moved upwardly relative to the locking device 11. The end 14 is firmly locked to the locking device by the disc 28 and the end 16 is locked for one way motion relative to the disc 36. The cable 16 can be pulled downwardly relative to FIG. 4 but it cannot be pulled upwardly because the disc 36 will ride up the cam surface 46 thus exerting transverse force against the flatted portion 33 on the oval cable thus locking it and preventing it from moving upwardly relative thereto.

Although the invention has been described with respect to preferred embodiments thereof, it is not to be so limited as changes and modificatons may be made which are within the full intended scope as defined by the appended claims.

I claim as my invention:

1. A cable lock and seal device comprising a body member formed with an orifice, a cable which has been flattened into an oval cross-section for a substantial length receivable through said orifice, a one way clamping means in said orifice of said body member for preventing said cable from moving relative to said body member, and a portion of said orifice within said body member adjacent said clamping means flattened so as to mate with said flattened portion of said oval cable to prevent it from being twisted or turned, wherein said clamping means comprises a cam member with an inclined surface and a disc which rides on said inclined surface and engages said flattened portion of said oval cross-sectional cable, and spring means urging said disc up said inclined surface, wherein said body member has a second orifice and said cam member has a second inclined surface, and a second disc which rides on said second inclined surface, and wherein one end of said cable in receivable into said second orifice and is locked to said body member by said second disc.

* * * * *